May 28, 1935.  H. B. GARDNER  2,003,075
OPERATING MECHANISM FOR MOTION PICTURE PROJECTORS AND PHONOGRAPHS
Filed May 9, 1932  8 Sheets-Sheet 1

Inventor:
Herman B. Gardner
By Dyrenforth, Lee, Chritton & Wiles,
Attorneys May 28, 1935.     H. B. GARDNER     2,003,075
OPERATING MECHANISM FOR MOTION PICTURE PROJECTORS AND PHONOGRAPHS
Filed May 9, 1932     8 Sheets-Sheet 5

Inventor:
Herman B. Gardner,
By Dyrenforth, Lee, Chritton & Wiles
Attorneys

May 28, 1935. H. B. GARDNER 2,003,075
OPERATING MECHANISM FOR MOTION PICTURE PROJECTORS AND PHONOGRAPHS
Filed May 9, 1932 8 Sheets-Sheet 7

Inventor:
Herman B. Gardner
By Dyrenforth, Lee, Chritton & Wiles
Attorneys May 28, 1935.   H. B. GARDNER   2,003,075
OPERATING MECHANISM FOR MOTION PICTURE PROJECTORS AND PHONOGRAPHS
Filed May 9, 1932   8 Sheets-Sheet 8

Inventor:
Herman B. Gardner,
By Dyrenforth, Lee, Chritton & Wiles,
Attorneys

Patented May 28, 1935

2,003,075

UNITED STATES PATENT OFFICE 2,003,075

OPERATING MECHANISM FOR MOTION PICTURE PROJECTORS AND PHONOGRAPHS

Herman B. Gardner, Chicago, Ill., assignor of forty-nine per cent to Harry J. Lurie, Chicago, Ill.

Application May 9, 1932, Serial No. 610,206

10 Claims.  (Cl. 88—16.2)

The invention relates to operating mechanism for motion picture projectors and phonographs, and has as its primary object the provision of improved mechanism for connecting the projector to the phonograph so that the two devices may be operated in synchronism or independently of each other.

One form of the invention is embodied in a device which comprises a motion picture projector, a phonograph, an electric motor and improved mechanism operatively connecting the motor to the projector and the phonograph. The improved mechanism comprises means whereby the projector may be operated independently of the phonograph at a plurality of speeds, means whereby the phonograph may be operated independently of the projector at a plurality of predetermined speeds, means whereby the projector and the phonograph may be operated in synchronism to project a film while sounds recorded during the taking of the picture are reproduced, means whereby the projector may be operated to project a film while incidental music, etc., is reproduced by the phonograph, means for reproducing sound and pictures from a sound film, and means whereby the film may be rewound.

The improved mechanism is preferably controlled by a single knob or dial which may be adjusted manually to effect the various combinations described above.

The projector will handle film which must be run at different speeds and the phonograph is adapted to utilize the new type long-playing records as well as records of the older type. In practice, the new type long-playing records are rotated at 33⅓ R. P. M. while the records of the older type are rotated at about 80 R. P. M.

It will become apparent from the following description that a combined motion picture projector and phonograph embodying the invention will provide a considerable variety of entertainment and requires no mechanical skill on the part of the operator.

Other objects and advantages will become apparent as the following detailed description progresses, reference being had to the accompanying drawings, wherein.

Figure 1:
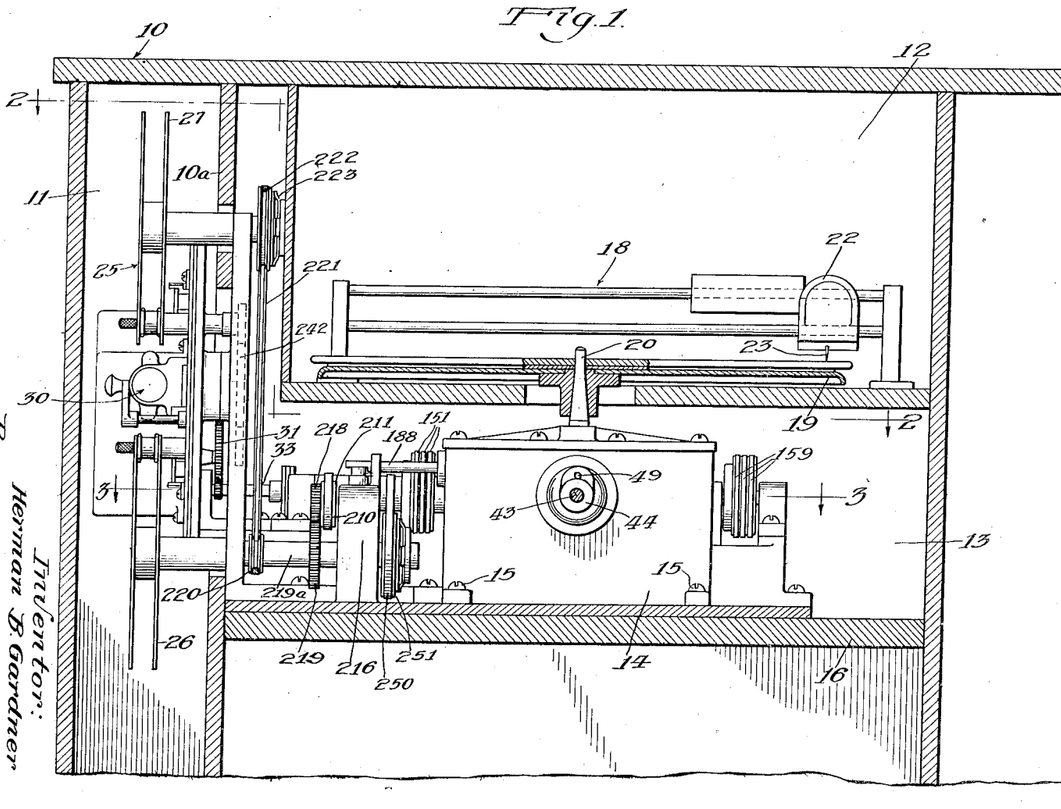
Figure 1 is a fragmentary vertical section taken through a cabinet in which apparatus embodying the invention are mounted, the apparatus being shown partly in section.
Figures 9, 10:
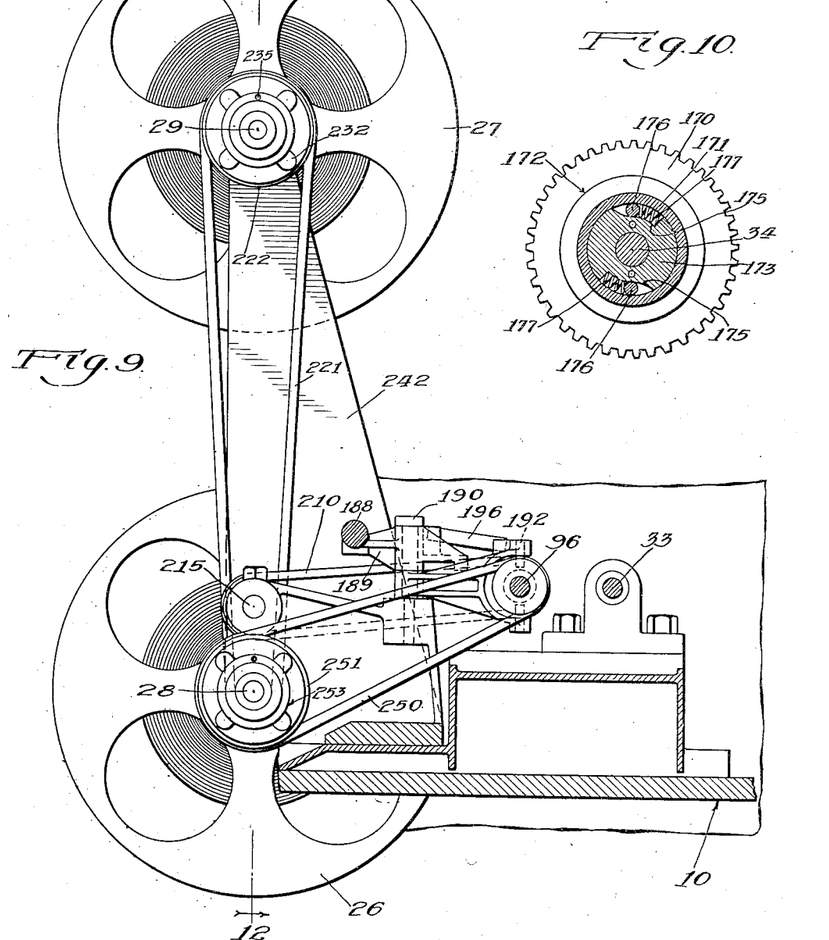
Figure 9 is a section taken on line 9—9 of Fig. 2.
Figure 10 is a section taken on line 10—10 of Fig. 3.

Referring for the present to Figures 1 and 9, the reference character 10 designates generally a housing or cabinet in which apparatus which embodies the invention is mounted. The cabinet 10 may be of any suitable or desired construction. In this instance, it comprises a projector compartment 11, a phonograph compartment 12 and a compartment 13 in which a gear box 14 is disposed. It will be noted that the gear box 14 is secured by screws 15 to a shelf 16 which forms part of the cabinet 10.

A sound reproducing device or phonograph 18 is disposed in the compartment 12. The phonograph 18 comprises a turntable 19 which is mounted on the tapered upper end of a vertically disposed spindle or shaft 20, which shaft 20 projects from the gear box 14. (See Figs. 1 and 4.) The phonograph 18 also comprises a movably mounted and electrically operated pickup device 22 of any suitable construction, the pickup device 22 being provided with the usual needle or stylus 23 adapted to traverse phonograph records placed on the turntable 19.

A motion picture projector 25 of any suitable or desired construction is mounted in the compartment 11. In this instance, the projector 25 has associated with it, a take-up reel 26 and a rewinding reel 27. (See Fig. 9.) The reels 26 and 27 are removably mounted on the squared ends of shafts 28 and 29, respectively. The projector 25 also comprises film advancing mechanism which is designated generally by the reference character 30 and is adapted to advance the film intermittently. The film advancing mechanism 30 is driven by gearing 31 from a shaft section 33 which forms a continuation of a shaft section 34 rotatably journaled in the gear box 14. (See Figs. 1 and 3.) The shaft sections 33 and 34 are constrained to rotate with each other by a coupling device 35.

Figure 2:
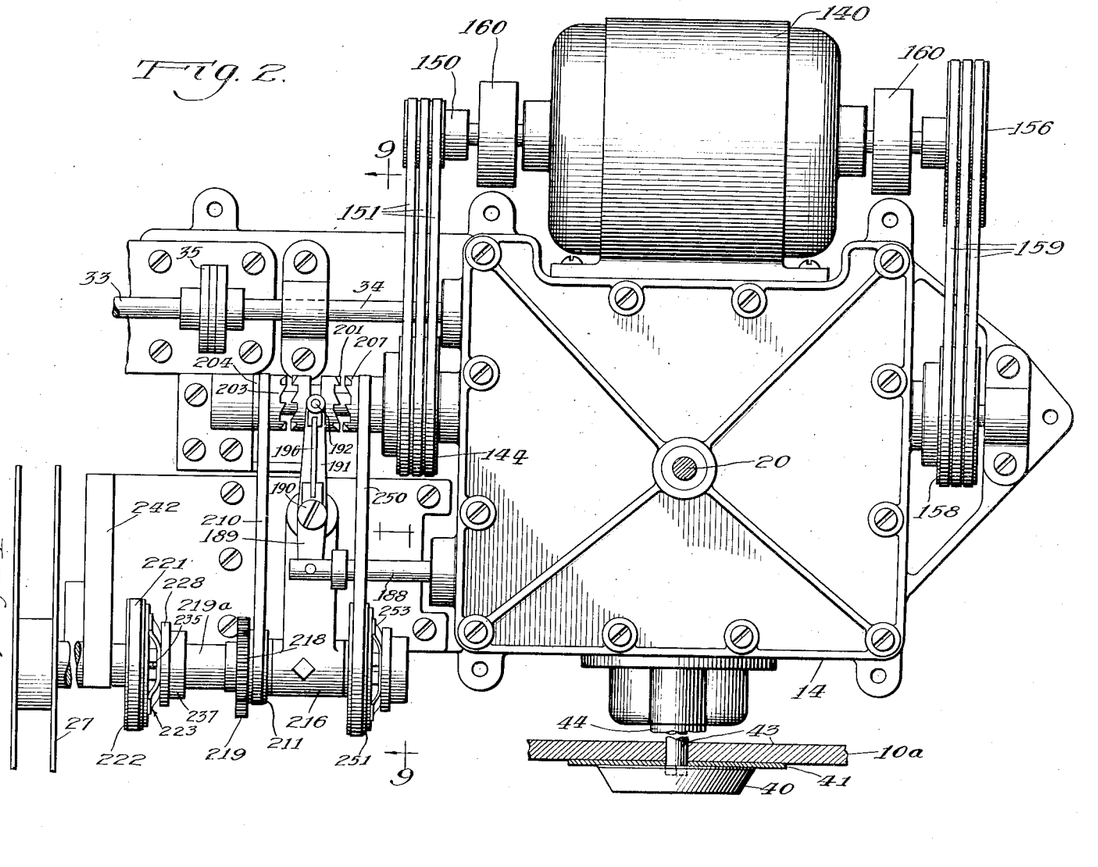
Figure 2 is a section taken on line 2—2 of Fig. 1, most of the cabinet being omitted in this view.
Figure 3:
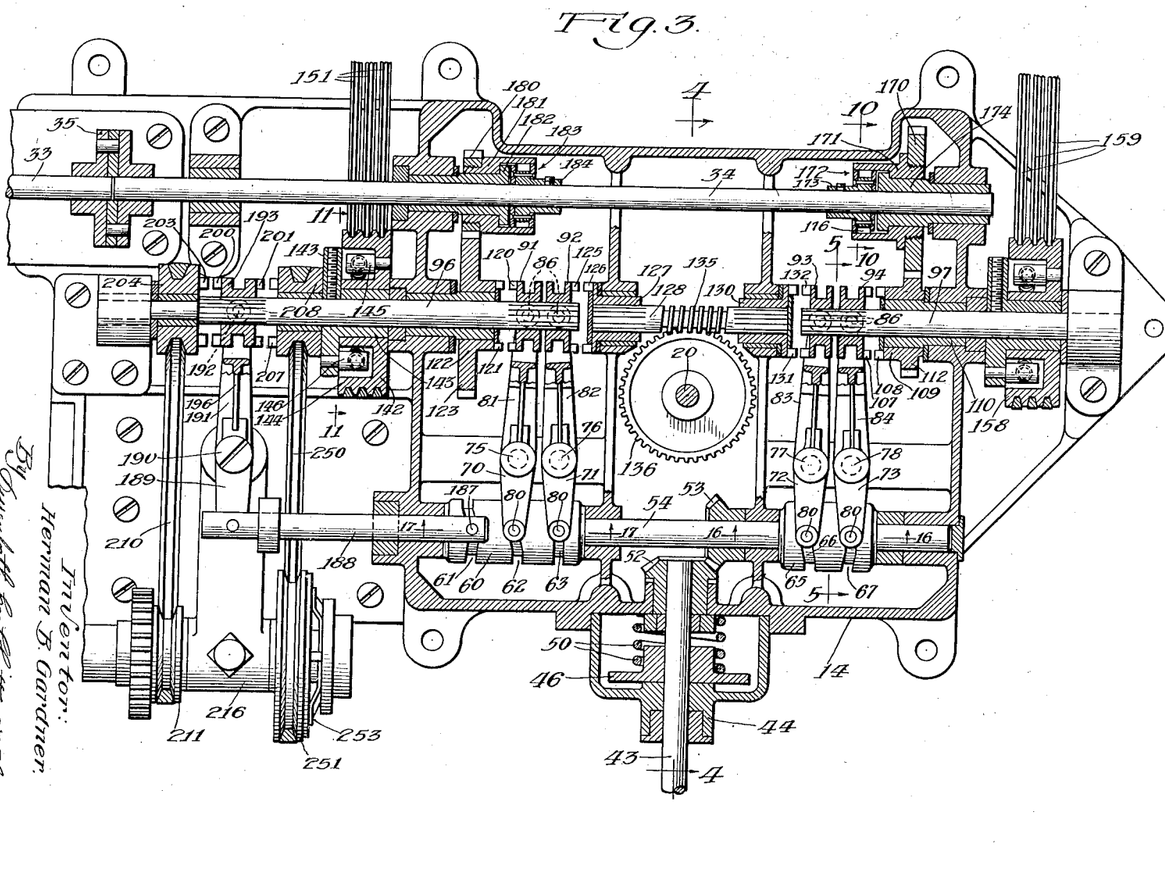
Figure 3 is an enlarged section taken on line 3—3 of Fig. 1.
Figure 4:
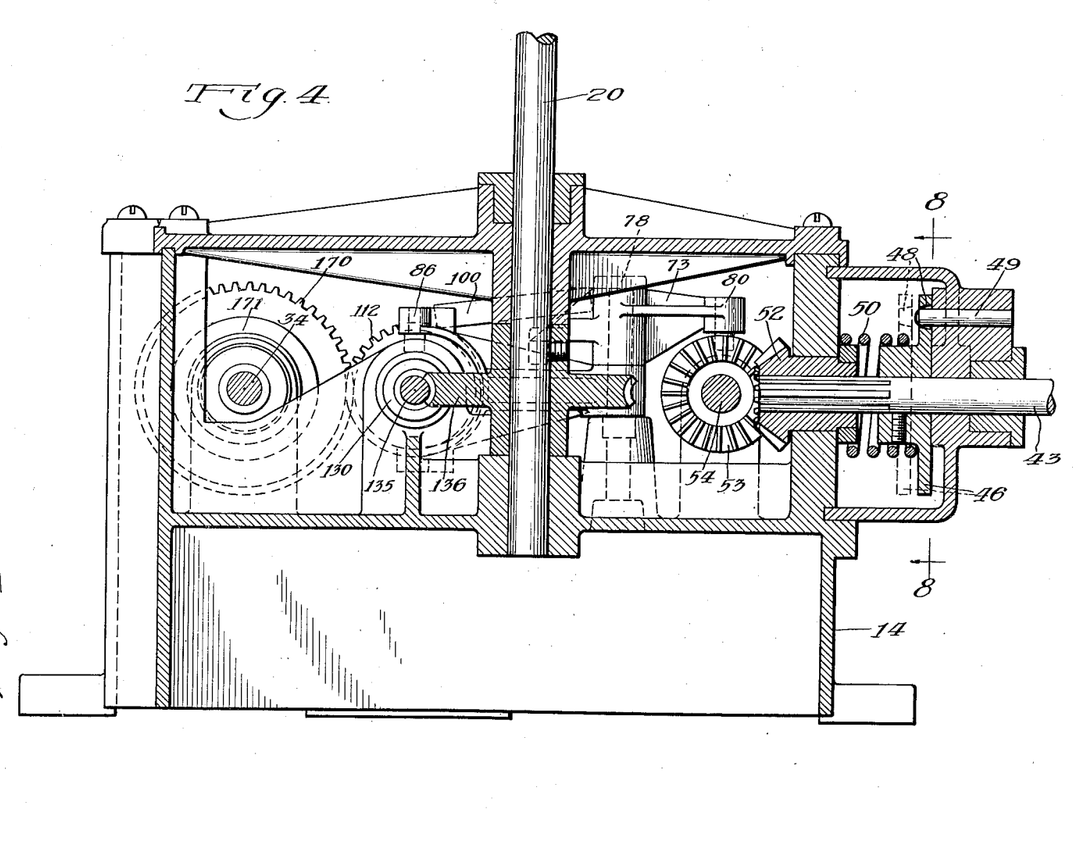
Figure 4 is a section taken on line 4—4 of Fig. 3.

The phonograph device 18 and the projector 25 are controlled by the operator through the medium of a knob 40 and a dial 41, the dial 41 being mounted on the front wall 10a of the cabinet 10. (See Fig. 2.) The knob 40 and the dial 41 are provided with suitable indicia (not shown) whereby the operator may adjust the knob to any predetermined position. The knob 40 is secured to the outer end of a shaft 43 which projects from the gear box 14, the shaft 43 being rotatably and slidably mounted in a wall of the gear box and in a bracket 44 mounted on the gear box. (See Figs. 3 and 4.) Constrained to rotate with the shaft 43 and disposed intermediate the bracket 44 and the gear box is a disc 46 having eight tapered holes 48 formed therethrough. A pin 49 carried by the bracket 44 is engageable with the holes 48, when the disc 46 occupies the position wherein it is shown in full lines in Fig. 4. Interposed between the gear box 14 and the disc 46 is a compression spring 50 which yieldingly urges the shaft 43 and the disc 46 to the right (Fig. 4). The construction is such that the operator may displace the shaft 43 longitudinally against the action of the spring 50 to disengage the disc 46 from the pin 49 whereupon the knob 40 may be angularly displaced to bring another hole 48 into registry with the pin 49. Then when the operator permits the spring 50 to restore the shaft 43 and the disc 46 to their original positions, the pin 49 will enter the hole 48 which has been brought into registry with it. The purpose of this construction will presently appear.

Splined to the inner end of the shaft 43 is a bevel gear 52 which meshes with a bevel gear 53 fixed to a shaft 54 rotatably journaled in the gear box. (See Fig. 3.) The shaft 54 extends at right angles to the shaft 43. A cam 60 keyed to the shaft 54 is provided with cam slots 61, 62 and 63. A cam 65 fixed to the shaft 54 is provided with cam slots 66 and 67. Associated with the cam slots 62, 63, 66 and 67 are levers 70, 71, 72 and 73, respectively, the levers 70, 71, 72 and 73 being pivoted on pins 75, 76, 77, and 78, respectively. The free ends of the levers are provided with pins 80, or the equivalent, which ride in the cam slots.

Pivoted to the pins 75, 76, 77 and 78 are levers 81, 82, 83 and 84, respectively, which are bifurcated at their free ends, the bifurcations being provided with pins 88 which ride in annular grooves provided in a plurality of clutch collars 91, 92, 93 and 94 controlled by the levers 81, 82, 83 and 84, respectively. The clutch collars 91 and 92 are splined on a shaft 96, the clutch collars 93 and 94 being splined on a shaft 97. The shafts 96 and 97 are rotatably journaled in the gear box 14 and project therefrom as best shown in Fig. 3.

The levers 70, 71, 72 and 73 are substantially identical in construction and the levers 81, 82, 83 and 84 are also substantially identical in construction, these levers being made in rights and lefts when such construction is required.

Figure 5:
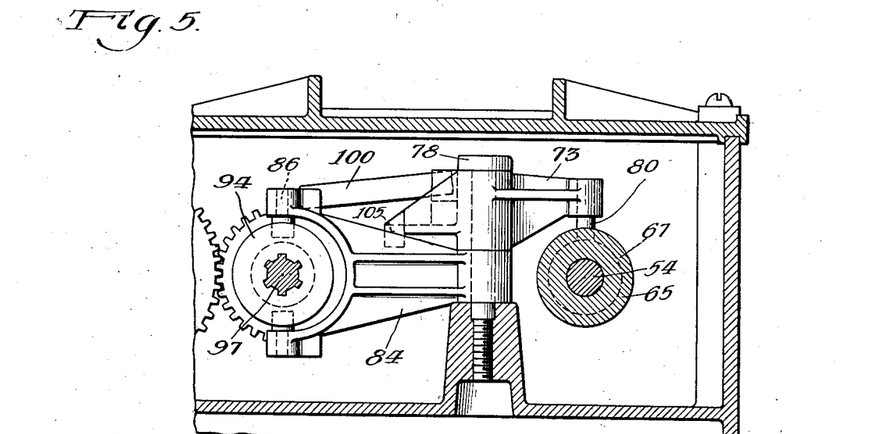
Figure 5 is a section taken on line 5—5 of Fig. 3.
Figure 6:
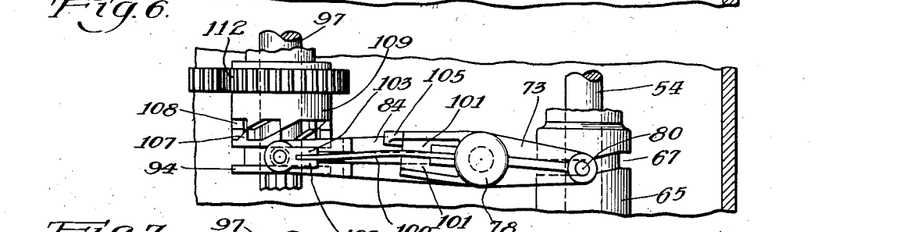
Figure 6 is a plan view of the mechanism shown in Fig. 5.
Figure 7:
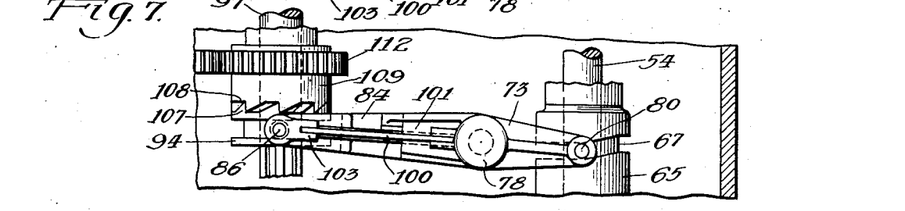
Figure 7 is a plan view of the same mechanism, the parts being shown in changed positions.
Figure 8:
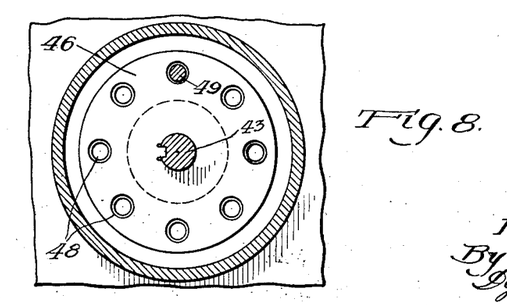
Figure 8 is a section taken on line 8—8 of Fig. 4.

The construction of the levers 73 and 84 is illustrated in detail in Figs. 5 to 7, inclusive. It will be noted that a leaf spring 100 has one of its ends disposed between bifurcations 101 formed integral with the lever 73, the other end of the leaf spring being disposed between bifurcations 103 formed integral with the lever 84. The construction is such that if the lever 73 is angularly displaced in either direction, the spring 100 will yieldingly urge the lever 84 in the same direction.

The lever 73 is provided with an arm 105 engageable with the lever 84 intermediate its ends. If the lever 73 is displaced in a counter clockwise direction (Figs. 6 and 7), the arm 105 will engage the lever 84 and angularly displace it in the same direction so that there cannot be any relative movement between the two levers during such displacement through the action of the spring 100.

Formed integral with the clutch collar 94 are clutch jaws 107 which are engageable with clutch jaws 108 formed integral with a clutch member 109 rotatably journaled on a bushing 110 which journals the shaft 97. A gear 112 is formed integral with the clutch member 109.

If it is assumed that the clutch collar 94 is in a position wherein its jaws 107 are disengaged from the jaws 108, it will be readily understood that if the lever 73 is displaced in a clock-wise direction (Fig. 6), the spring 100 will yieldingly urge the lever 84 in the same direction so that the jaws 107 will be urged into operative engagement with the jaws 108 as soon as the jaws come into registry with each other. This construction permits the jaws 107 and 108 to be engaged with each other while the apparatus is not in operation and also prevents the jaws from being damaged when they are brought into engagement with each other. When the clutch jaws 107 are to be disengaged from the clutch jaws 108, the lever 73 is angularly displaced in a counter clock-wise direction (Fig. 6) so that the arm 105 angularly displaces the lever 84 in the same direction. Such displacement of lever 84 forces the clutch jaws 107 out of engagement with the jaws 108.

It will be noted that each of the set of levers 70—81, 71—82 and 72—83 is provided with a leaf spring corresponding to the leaf spring 100 and having the same function. Likewise, each of the levers 70, 71 and 72 is provided with an arm which corresponds to the arm 105 and has the same function.

The clutch collar 91 is provided with integral clutch jaws 120 which are engageable with clutch jaws 121 formed integral with a clutch member 122, the clutch member 122 having a gear 123 formed integral with it. The clutch collar 92 is provided with integral clutch jaws 125 which are engageable with clutch jaws 126 formed integral with a clutch member 127 which is keyed to one end of a shaft 128 rotatably journaled in the gear box. A clutch member 130 keyed to the other end of the shaft 128 is provided with integral clutch jaws 131 which are engageable with clutch jaws 132 formed integral with the clutch collar 93.

A worm 135 is cut in the shaft 128 and meshes with a worm wheel 136 fixed to the shaft or spindle 20 which drives the turntable 19.

The cam slots 62, 63, 66 and 67 are of such conformation that when the cams 60 and 65 are rotated to bring them into any predetermined position, certain sets of cooperating clutch jaws described above will be engaged with each other and other sets of the cooperating clutch jaws will be disengaged from each other. It will be readily understood that the indicia (not shown) on the dial 41 will indicate the condition which obtains when the cams 60 and 65 are in any of their positions corresponding to the holes 48 in the disc 46. The dial will indicate that the clutch devices described above are adjusted to drive the phonograph device and the projector at predetermined speeds or to drive either of the devices at a predetermined speed while the other device is functionally inoperative. The operation of the apparatus is described in detail below.

The shafts 96 and 97 are operatively connected to an electric motor 140 mounted on the gear box 14. (See Fig. 2). The means for operatively connecting the shaft 96 to the motor 140 preferably comprises a yielding driving device 142 with which the shaft 96 is constrained to rotate. The device 142 comprises a hub 143 fixed to the shaft 96 and rotatably journaled on the hub 143 is a grooved pulley 144. (See Figs. 3 and 11.) Pins 145 and 146 are fixed to the grooved pulley 144 and the hub 143, respectively. A helical spring 148 has its ends secured to the pins 145 and 146, the construction being such that when the grooved pulley 144 is driven, it will drive the hub 143 through the spring 148 and the hub 143 will, in turn, drive the shaft 96. The spring 148 absorbs shocks, etc., and tends to drive the shaft 96 at a constant speed even though there are monetary variations in the speed at which the grooved pulley 144 is driven.

The shaft of the motor 140 is provided with pulleys 150 and 156. The grooved pulley 144 is connected to the grooved pulley 150 by a plurality of belts 151. As shown, three belts are preferably employed for this purpose. The belts 151 drive the grooved pulley 144 at a substantially constant speed even though there are momentary variations in the speed at which the pulley 150 is driven by the motor 140. Thus, slipping or whipping of one of the belts 151 is counteracted by the action of the other two belts 151.

A grooved pulley 158 is fixed to the shaft 97 and is operatively connected to the pulley 156 by a plurality of belts 159. Three belts 159 are preferably employed for this purpose and they function in substantially the same manner as the belts 151 so that the shaft 97 is driven at a substantially constant speed even though there are momentary variations of speed at which the pulley 156 is driven.

It will be noted that fly wheels 160 are provided upon the shaft of the motor 140. The function of the fly wheels 160 is to prevent any appreciable variation in the speed of the motor 140.

The gear 112 associated with the clutch jaws 108 meshes with a gear 170 fixed to a clutch member 171 which is rotatably journaled on a bushing 174 adapted to journal the shaft section 34. The clutch member 171 forms one member of an over-running clutch which is designated generally by the reference character 172. As best shown in Figs. 3 and 10, the clutch 172 comprises a hub 173 fixed to the shaft section 34. The hub 173 is provided with diametrically disposed notches 175. Rollers 176 disposed in the notches 175 are yieldingly urged by springs 177 into positions wherein they will effect a driving engagement between the hub 173 and the clutch member 171. When the clutch member 171 is driven in a counter clock-wise direction, (Fig. 10), the springs 177 will yield and the clutch member 171 will stand stationary or rotate at a slow speed on the hub 173.

The gear 123 associated with the clutch jaws 121 meshes with a gear 180 fixed to a clutch member 181 which is journaled on a bushing 182 adapted to journal the shaft section 34. The clutch member 181 forms part of an over-running clutch which is designated generally by the reference character 183 and comprises a hub member 184, the hub member 184 being fixed to the shaft section 34. The over-running clutch 183 is preferably identical in construction with the over-running clutch 172 and has the same function. In other words, it permits the gear 180 to drive the shaft section 34 in one direction and permits the shaft section to be rotated in the same direction while the gear remains stationary or rotates at a slower speed.

Engaging the cam slot 61 is a pin 187, or the equivalent, which projects from a shaft 188 slidably journaled in a wall of the gear box 14. The shaft 188 has its left hand end (Fig. 3) pivoted to a lever 189 which is pivoted by a pin 190. Also pivoted on the pin 190 is a lever 191. The free end of the lever 191 is bifurcated and is provided with pins 192, or the equivalent, which engage an annular groove formed in a clutch collar 193, the clutch collar 193 being splined on the shaft 96.

The levers 189 and 191 resemble the levers 78 and 84, respectively, in construction and are connected to each other through a spring 195 which functions similarly to the spring 100 described above. However, in this instance, no means is provided on the lever 189 for positively displacing the lever 191 when the lever 189 is angularly displaced. In other words, all angular displacement of the lever 191 by the lever 189 is accomplished through the spring 195 which is considerably heavier than the spring 100 described above. The clutch collar 193 is provided with clutch jaws on the two sides thereof, which clutch jaws cooperate with clutch jaws on adjacent pulleys. The spring 195 is of such size and strength that it will force the lever 191 in either direction to engage the clutch jaws on it with one set of the adjacent clutch jaws on the adjacent pulleys.

The clutch collar 193 is provided on one side with integral clutch jaws 200 and on the other side with integral clutch jaws 201. The clutch jaws 200 are engageable with clutch jaws 203 projecting from a pulley 204 which is journaled on the shaft 96. The clutch jaws 201 are engageable with clutch jaws 207 projecting from a pulley 208 which is rotatably journaled on the shaft 96.

The pulley 204 is operatively connected by a belt 210 to a pulley 211 rotatably journaled on a stud shaft 215 which projects from a bracket 216 projecting from the gear box 14. (See Figs. 1, 3 and 9.) Constrained to rotate with the pulley 211 is a gear 218 which meshes with a gear 219 fixed to a sleeve 219a rotatably journaled on the shaft 29. A pulley 220 formed integral with the sleeve 219a is operatively connected by a belt 221 to a pulley 222 associated with the shaft 29, the pulley 222 being adapted to drive the shaft 29 through a friction clutch which is designated generally by the reference character 223.

Figures 11, 12, 13:
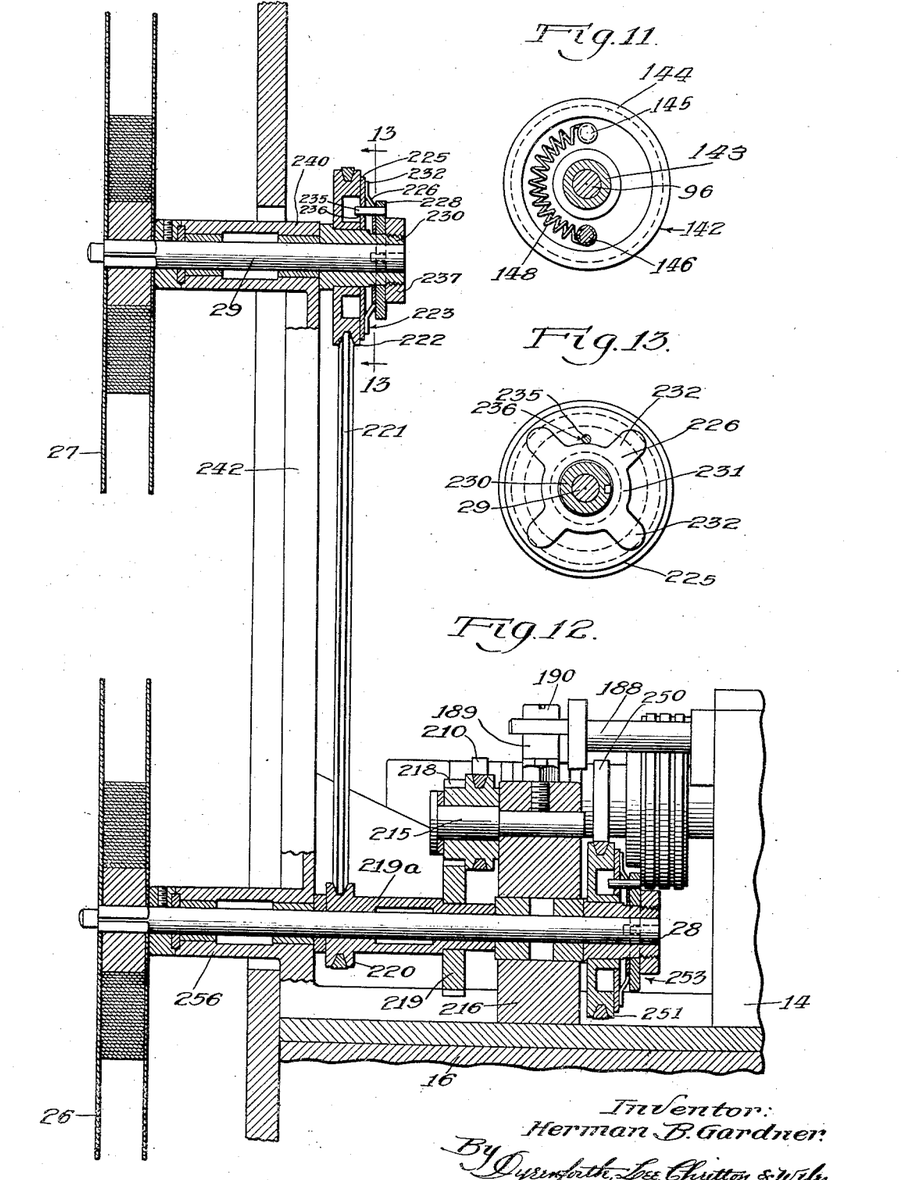
Figure 11 is a section taken on line 11—11 of Fig. 3.
Figure 12 is a section taken on line 12—12 of Fig. 9.
Figure 13 is a section taken on line 13—13 of Fig. 12.
Figure 14:
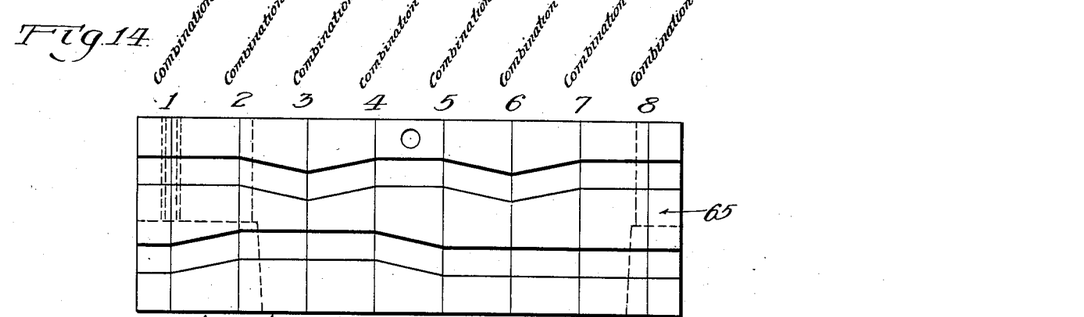
Figure 14 is a developed view of a cam which forms part of the improved apparatus.
Figure 15:
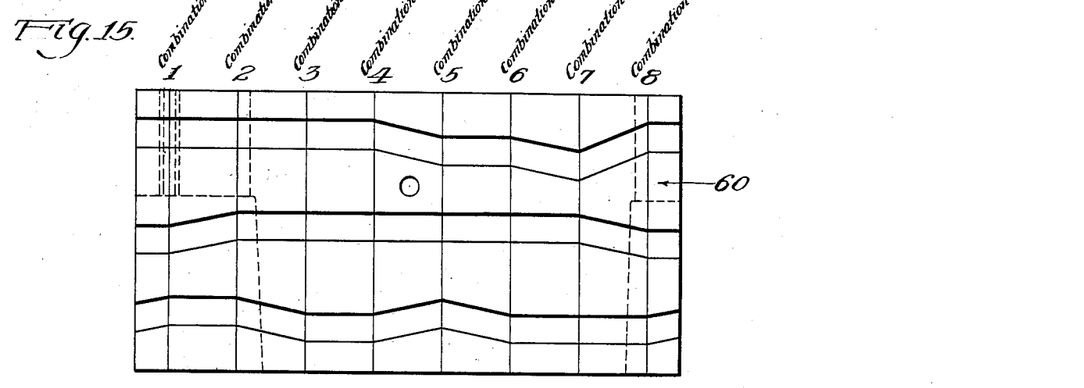
Figure 15 is a developed view of another cam which forms part of the improved apparatus.
Figure 16:
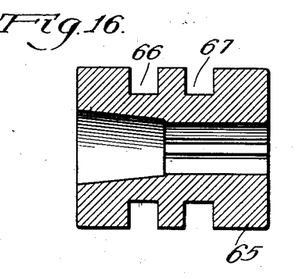
Figure 16 is a section taken on line 16—16 of Fig. 3.
Figure 17:
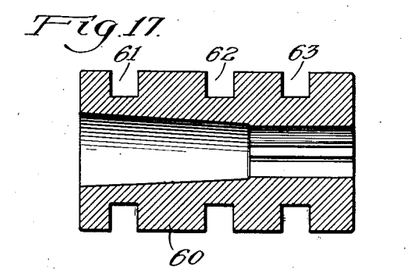
Figure 17 is a section taken on line 17—17 of Fig. 3.
Figure 18:
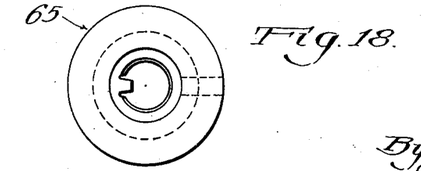
Figure 18 is an end elevation of the cam shown in Fig. 16.

As best shown in Figs. 12 and 13, the friction clutch 223 comprises a friction disc 225 which is yieldingly urged against one side of the pulley 222 by a spring 226. The friction disc 225 is preferably formed from a phenolic condensation product, or the equivalent. The spring 226 is interposed between the friction disc 225 and a collar 228 splined on a sleeve 230 fixed to the shaft 29. It will be noted that the pulley 222 is rotatably journaled on the sleeve 230. The spring 226 comprises a hub portion 231 which encircles the sleeve 230. Formed integral with the hub portions 231 are arms 232 which abut against the friction disc 225. A pin 235 projecting from the collar 228 passes between two of the arms 232 and through a hole 236 formed in the friction disc 225. A nut 237 screw threaded upon the sleeve 230 may be adjusted to increase or decrease the pressure exerted upon the disc 225 by the spring 226.

When the pulley 222 is driven by the belt 221, the pulley drives the friction disc 225 and it drives the collar 228 through the pin 235. The collar 228 drives the sleeve 230 which, in turn, drives the shaft 29. The pin engages one of the arms 232 of the spring 226 and insures that the spring will rotate with the friction disc.

The sleeve 230 is keyed to the shaft 29 which is journaled in a boss 240 provided upon the upper end of a standard 242 secured to the shelf 16.

Referring now to Fig. 3, it will be noted that the pulley 208 is operatively connected by a belt 250 to a pulley 251 associated with the shaft 28. The pulley 251 is operatively connected to the shaft 28 through a friction clutch which is designated generally by the reference character 253. The friction clutch 253 is preferably identical in construction with the friction clutch 223 and permits relative angular movement between the pulley 251 and the shaft 28. The friction clutches 223 and 253 are both shown in section in Fig. 12. As best shown in Fig. 12, the shaft 28 is journaled in the bracket member 216 and in a boss 256 formed integral with the standard 242.

From the foregoing description, it will be readily understood that when the shaft 96 is rotating and the clutch jaws 201 engage the clutch jaws 207, the shaft 28 will be driven through the medium of the pulley 208, the belt 250, the pulley 251 and the friction clutch 253. Then if the projector is functionally operative, the reel 26 will wind up film which is withdrawn from the reel 27 by the film advancing mechanism 30. It will also be understood that if the clutch jaws 201 are disengaged from the clutch jaws 207 and the clutch jaws 200 are brought into engagement with the clutch jaws 203, the pulley 204 will drive the pulley 211 through the belt 210 and the rotation of the pulley 211 will be imparted to the sleeve 219a through the gears 218 and 219. The pulley 220 formed integral with the sleeve 219a will then drive the pulley 222 through the belt 221 and the pulley 222 will drive the shaft 29 through the friction clutch 223. When the shaft 29 is driven in this manner, film carried by the reel 26 may be rewound upon the reel 27. When the film is being rewound, it is not threaded through the film advancing mechanism 30, which is then stationary.

The friction clutch 253 permits the pulley 251 to rotate faster than the shaft 28 as the film piles up upon the reel 26 after it has been advanced by the film advancing mechanism 30. The friction clutch 223 permits the pulley 222 to rotate faster than the shaft 29 when the film piles up upon the reel 27 during the rewinding operation.

If it is assumed that the shaft 96 is being driven by the pulley device 142, it will be readily understood that if the clutch jaws 120 are brought into engagement with the clutch jaws 121, the gear 123 will drive the gear 180 and thus rotation of the gear 180 will be imparted to the shaft section 34 through the over-running clutch 183. The gear section 34 will then drive the gear section 33 and the gear section 33 will, in turn, drive the film advancing mechanism at a predetermined speed. Now, if the clutch jaws 120 are left in engagement with the clutch jaws 121 and the clutch jaws 125 are brought into engagement with the clutch jaws 126, the shaft 96 will drive the shaft 128 and the worm 135 will drive the worm gear 136. The gear 136 will then drive the shaft or spindle 120 which, in turn, will drive the turntable 19 at a predetermined speed. Obviously, the projector may be operated while the phonograph is functionally inoperative or both mechanisms may be operated at the same time at predetermined speeds so that they run in synchronism with each other. It is understood, of course that whenever the film advancing mechanism 30 is in operation, the shaft 28 is being driven through the friction clutch 253 to wind the film upon the reel 26.

Now, if it is assumed that the clutch jaws 120 are not engaged with the clutch jaws 121 and that the clutch jaws 125 are engaged with the clutch jaws 126, it will be understood that the projector will not be driven but the turntable 19 will rotate at a predetermined speed.

If the clutch members 120 and the clutch members 125 are not engaged with the clutch members 121 and the clutch members 126, respectively, the projector may be driven, while the turntable remains stationary, by bringing the clutch jaws 107 into engagement with the clutch jaws 108 so that the gear 112 will drive the gear 170 and the gear 170 will, in turn, drive the shaft section 34 through the over-running clutch 172. The film advancing mechanism 30 may then be operated at a different speed than that at which it is operated when the clutch jaws 120 engage the clutch jaws 121.

Now, if the apparatus is adjusted so that the clutch jaws 125 engage the clutch jaws 126 and the clutch jaws 107 engage the clutch jaws 108, the projector and phonograph will be operated in synchronism at predetermined speeds. If it is desired to have the phonograph run at a different speed while the projector is being driven through the clutch jaws 107 and 108, the clutch jaws 125 may be disengaged from the clutch jaws 126 and the clutch jaws 132 may be brought into engagement with the clutch jaws 131. The shaft 97 will then drive the shaft 128 so that the worm 135 will drive the worm gear 136.

The cam grooves 61, 62, 63, 66 and 67 are formed so that the apparatus may be adjusted in eight different combinations, each combination corresponding to one of the holes 48 provided in the disc 46.

*First combination.*—The clutch jaws 120 engage the clutch jaws 121 and the clutch jaws 125 engage the clutch jaws 126. The clutch jaws 201 engage the clutch jaws 207. The clutch collars 93 and 94 are in their neutral positions. The shaft section 33 is then driven at 1440 R. P. M. while the turntable rotates at 33⅓ R. P. M.

*Second combination.*—The clutch jaws 125 engage the clutch jaws 126 and the clutch jaws 107 engage the clutch jaws 108. The clutch jaws 201 engage the clutch jaws 207. The clutch collars 91 and 93 are in their neutral positions. The shaft section 33 is then driven at 960 R. P. M. while the turntable rotates at 33⅓ R. P. M.

*Third combination.*—The clutch jaws 132 engage the clutch jaws 131 and the clutch jaws 107 engage the clutch jaws 108. The clutch jaws 201 engage the clutch jaws 207. The clutch collars 91 and 92 are in their neutral positions. The shaft section 33 then rotates at 960 R. P. M. while the turntable rotates at 80 R. P. M.

*Fourth combination.*—The clutch jaws 107 engage the clutch jaws 108. The clutch jaws 201 engage the clutch jaws 208. The clutch collars 91, 92 and 93 are in their neutral positions. The shaft section 33 then rotates at 960 R. P. M. while the turntable remains stationary.

*Fifth combination.*—The clutch jaws 125 engage the clutch jaws 126. The clutch collars 193, 191, 93 and 94 are in their neutral positions. The projector remains functionally inoperative while the turntable rotates at 33⅓ R. P. M.

*Sixth combination.*—The clutch jaws 132 engage the clutch jaws 131. The clutch collars 193, 91, 92 and 94 are in their neutral positions. The projector remains functionally inoperative while the turntable rotates at 80 R. P. M.

*Seventh combination.*—The clutch collars 91, 92, 93 and 94 are in their neutral positions. The clutch jaws 200 engage the clutch jaws 203. The reel 27 on the shaft 29 is driven to rewind the film.

*Eighth combination.*—The clutch jaws 120 engage the clutch jaws 121 and the clutch jaws 201 engage the clutch jaws 207, the clutch collars 92, 93 and 94 being in their neutral positions. The shaft section is then driven at 1440 R. P. M. while the turntable remains stationary. This adjustment is employed for sound film.

It will be noted that the projector can be driven at two different speeds and that the turntable can also be driven at two different speeds. When the turntable is driven at 33⅓ R. P. M. it is adapted to handle the new type long-playing records. When the turntable is driven at 80 R. P. M. it is adapted to handle the older type of phonograph records. In the first combination, the projector is adapted to handle films while the phonograph is simultaneously and synchronously reproducing sounds which were recorded when the picture was filmed. In the second combination, the projector handles silent film while the phonograph reproduces sounds or music from a phonograph record of the new long-playing type. In the third combination the projector handles silent film while the phonograph reproduces from a record of the older type. In the fourth combination, the projector handles silent film while the phonograph remains functionally inoperative. The projector remains functionally inoperative in the fifth and sixth combinations.

It will be noted that the shafts 28 and 29 and the mechanisms for driving these shafts are mounted independently of the film advancing mechanism 30. Thus, the shafts 28 and 29 project from the bracket 34 which is part of the gear box 14. The film advancing mechanism 30 and the remaining parts of the projector are mounted on a bracket forming part of the gear box 14. (See Fig. 1.) It will be understood that when a film is to be projected, the reel holding the film is placed upon the shaft 29. The forward end of the film is then threaded through the film advancing mechanism 30 and attached to the reel 28 which winds up the film as it passes through the film advancing mechanism. When a film is to be rewound, it simply passes from the reel on the shaft 28 to the reel on the shaft 29 without passing through the film advancing mechanism.

The entire machine is controlled by the knob 40. With the exception of the task of threading the film through the film advancing mechanism and rewinding it, the operator need not manipulate any of the apparatus. Therefore, as indicated above, the apparatus does not require a skilled operator.

I claim:

1. In a transmission, a shaft, a second shaft having its axis coincident with the axis of the first mentioned shaft, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, means for driving the first mentioned shaft, means for driving the second shaft, clutch means for coupling the first mentioned shaft to said third shaft, clutch means for coupling said second shaft to said third shaft, means including a clutch for operatively connecting the first mentioned shaft to said fourth shaft, and means including a clutch for operatively connecting said second shaft to said fourth shaft.

2. In a transmission, a shaft, a second shaft having its axis coincident with the axis of the first mentioned shaft, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, means for driving the first mentioned shaft, means for driving the second shaft, clutch means for coupling the first mentioned shaft to said third shaft, clutch means for coupling said second shaft to said third shaft, means including a clutch for operatively connecting the first mentioned shaft to said fourth shaft, means including a clutch for operatively connecting said second shaft to said fourth shaft, and cam means for controlling said clutches.

3. In a transmission, a shaft, a second shaft having its axis coincident with the axis of the first mentioned shaft, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, means for driving the first mentioned shaft, means for driving the second shaft, clutch means for coupling the first mentioned shaft to said third shaft, clutch means for coupling said second shaft to said third shaft, means including a clutch for operatively connecting said second shaft to said fourth shaft, cam means for controlling said clutches, and manually operable means for bringing said cam means into a plurality of adjusted positions.

4. In a transmission, a shaft, a second shaft having its axis coincident with the axis of the first mentioned shaft, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, a fifth shaft, means intermediate said third shaft and said fifth shaft whereby said third shaft drives said fifth shaft, means for driving the first mentioned shaft, means for driving the second shaft, clutch means for coupling the first mentioned shaft to said third shaft, clutch means for coupling said second shaft to said third shaft, means including a clutch for operatively connecting the first mentioned shaft to said fourth shaft, and means including a clutch for operatively connecting said second shaft to said fourth shaft.

5. In a transmission, a shaft, a second shaft having its axis coincident with the axis of the first mentioned shaft, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, a fifth shaft, means intermediate said third shaft and said fifth shaft whereby said third shaft drives said fifth shaft, means for driving the first mentioned shaft, means for driving the second shaft, clutch means for coupling the first mentioned shaft to said third shaft, clutch means for coupling said second shaft to said third shaft, means including an over-running clutch for operatively connecting the first mentioned shaft to said fourth shaft, and means including an over-running clutch for operatively connecting said second shaft to said fourth shaft.

6. In a device of the kind described having a motion picture projector and a phonograph, means for operating said projector and said phonograph, said means comprising an electric motor, a shaft, a second shaft having its axis coincident with the axis of the first mentioned shaft, means operatively connecting the first mentioned shaft to said motor, means operatively connecting the second shaft to said motor, a third shaft having its axis coincident with the axes of the first mentioned shaft and said second shaft, said third shaft being disposed intermediate the first mentioned shaft and said second shaft, a fourth shaft spaced from and extending parallel with the first mentioned shaft, said fourth shaft being adapted to drive said projector, a fifth shaft for driving said phonograph, means operatively connecting said fifth shaft to said third shaft, clutch means for coupling the first mentioned shaft to said third shaft, clutch means for coupling said second shaft to said third shaft, means including a clutch for operatively connecting the first mentioned shaft to said fourth shaft, and means including a clutch for operatively connecting said second shaft to said fourth shaft.

7. In a device of the kind described having a motion picture projector and a phonograph, means for operating said projector and said phonograph, said means comprising an electric motor, a shaft, a second shaft having its axis coincident with the axis of the first mentioned shaft, means operatively connecting the first mentioned shaft to said motor, means operatively connecting the second shaft to said motor, a third shaft having its axis coincident with the axes of the first mentioned shaft and said second shaft, said third shaft being disposed intermediate the first mentioned shaft and said second shaft, a fourth shaft spaced from and extending parallel with the first mentioned shaft, said fourth shaft being adapted to drive said projector, a fifth shaft for driving said phonograph, means operatively connecting said fifth shaft to said third shaft, clutch means for coupling the first mentioned shaft to said third shaft, means including a clutch for operatively connecting the first mentioned shaft to said fourth shaft, means including a clutch for operatively connecting said second shaft to said fourth shaft, cam means for controlling said clutches, and manually operable means for bringing said cam means into a plurality of adjusted positions.

8. In a device of the kind described having a motion picture projector and a phonograph, said motion picture projector including a shaft, a reel for rewinding film, means for operating said projector and said phonograph, said means comprising an electric motor, a second shaft having its axis coincident with the first mentioned shaft, means operatively connecting the first-mentioned shaft to said motor, means operatively connecting the second shaft to said motor, a third shaft having its axis coincident with the axes of the first mentioned shaft and said second shaft, said third shaft being disposed intermediate the first mentioned shaft and said second shaft, a fourth shaft spaced from and extending parallel to the first mentioned shaft, said fourth shaft being adapted to drive said projector, a fifth shaft for driving said phonograph, means operatively connecting said fifth shaft to said third shaft, clutch means for coupling said second shaft to said third shaft, means including a clutch for operatively connecting the first mentioned shaft to said fourth shaft, means including a clutch for operatively connecting said second shaft to said fourth shaft, means including a clutch for operatively connecting the first mentioned shaft to said rewinding shaft and said reel, and manually operable means for controlling said clutches.

9. In a device of the kind described having a motion picture projector and a phonograph, mechanism for operating said projector and said phonograph, said mechanism comprising an electric motor, means driven by said motor and including a plurality of clutches for actuating said projector at a plurality of predetermined speeds, means driven by said motor and including a clutch for actuating said phonograph, a shaft, cam means on said shaft for controlling said clutches, and manually operable means for rotating said shaft to bring said cam means into a plurality of adjusted positions.

10. In a motion picture projector, an electric motor, means driven by said motor and including a plurality of clutches for actuating said projector at a plurality of predetermined speeds, a shaft, a cam fixed to said shaft, a second shaft geared to the first mentioned shaft, a knob on said second shaft whereby it may be rotated to bring said cam into a plurality of adjusted positions, and means associated with one of said shafts for retaining said cam in said adjusted positions.

HERMAN B. GARDNER.